(12) United States Patent
Harvey et al.

(10) Patent No.: US 12,198,423 B2
(45) Date of Patent: *Jan. 14, 2025

(54) METHOD AND SYSTEM FOR ASSESSING DAMAGE TO INFRASTRUCTURE

(71) Applicant: STATE FARM MUTUAL AUTOMOBILE INSURANCE COMPANY, Bloomington, IL (US)

(72) Inventors: Brian N. Harvey, Bloomington, IL (US); Nathan L. Tofte, Downs, IL (US); Roger D. Schmidgall, Normal, IL (US); Michael Jeffrey Aviles, Bloomington, IL (US); Kyle Pott, Bloomington, IL (US); Rosemarie Geier Grant, Ellsworth, IL (US); Eric Haefli, Bloomington, IL (US); Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,977

(22) Filed: Oct. 31, 2022

(65) Prior Publication Data
US 2023/0081273 A1    Mar. 16, 2023

Related U.S. Application Data

(63) Continuation of application No. 16/831,401, filed on Mar. 26, 2020, which is a continuation of application
(Continued)

(51) Int. Cl.
*G06K 9/00* (2022.01)
*G06F 18/24* (2023.01)
(Continued)

(52) U.S. Cl.
CPC .......... *G06V 20/176* (2022.01); *G06F 18/24* (2023.01); *G06T 7/0002* (2013.01);
(Continued)

(58) Field of Classification Search
None
See application file for complete search history.

(56) References Cited

U.S. PATENT DOCUMENTS 7,809,587 B2   10/2010   Dorai et al.
8,346,578 B1    1/2013   Hopkins, III et al.
(Continued)

OTHER PUBLICATIONS

Atkins et al., "An Integrated damage, visual, and radar analysis of the 2013 Moore Oklahoma EF5 tornado," American Meteorological Society, Jul. 2014.
(Continued)

*Primary Examiner* — SJ Park
(74) *Attorney, Agent, or Firm* — MARSHALL, GERSTEIN & BORUN LLP

(57) ABSTRACT

A method and system may survey a property using aerial images captured from an unmanned aerial vehicle (UAV), a manned aerial vehicle (MAV) or from a satellite device. The method may include identifying a commercial property for a UAV to perform surveillance, and directing the UAV to hover over the commercial property and capture aerial images at predetermined time intervals. Furthermore, the method may include receiving the aerial images of the commercial property captured at the predetermined time intervals, detecting a surveillance event at the commercial property, generating a surveillance alert, and transmitting the surveillance alert to an electronic device associated with an owner of the commercial property.

17 Claims, 5 Drawing Sheets

Related U.S. Application Data

No. 15/966,086, filed on Apr. 30, 2018, now Pat. No. 11,069,050, which is a continuation of application No. 15/718,323, filed on Sep. 28, 2017, now Pat. No. 10,007,992, which is a continuation of application No. 15/165,457, filed on May 26, 2016, now Pat. No. 9,805,456, which is a continuation of application No. 14/808,502, filed on Jul. 24, 2015, now Pat. No. 9,390,489, which is a continuation of application No. 14/510,784, filed on Oct. 9, 2014, now Pat. No. 9,129,355.

(51) Int. Cl.
| | | |
|---|---|---|
| G06T 7/00 | (2017.01) | |
| G06T 7/13 | (2017.01) | |
| G06T 7/60 | (2017.01) | |
| G06T 7/62 | (2017.01) | |
| G06T 15/00 | (2011.01) | |
| G06V 10/42 | (2022.01) | |
| G06V 10/44 | (2022.01) | |
| G06V 20/10 | (2022.01) | |

(52) U.S. Cl.
CPC .......... *G06T 7/0004* (2013.01); *G06T 7/0008* (2013.01); *G06T 7/13* (2017.01); *G06T 7/60* (2013.01); *G06T 7/62* (2017.01); *G06T 15/005* (2013.01); *G06V 10/42* (2022.01); *G06V 10/44* (2022.01); *G06V 20/182* (2022.01); *G06T 2200/04* (2013.01); *G06T 2200/24* (2013.01); *G06T 2207/10016* (2013.01); *G06T 2207/10021* (2013.01); *G06T 2207/10024* (2013.01); *G06T 2207/10028* (2013.01); *G06T 2207/10032* (2013.01); *G06T 2207/10036* (2013.01); *G06T 2207/30108* (2013.01); *G06T 2207/30184* (2013.01)

(56) References Cited

U.S. PATENT DOCUMENTS

| | | | |
|---|---|---|---|
| 8,380,545 B2 | 2/2013 | Chen et al. | |
| 8,666,786 B1 | 3/2014 | Wirz et al. | |
| 8,756,085 B1 | 6/2014 | Plummer et al. | |
| 8,818,572 B1 | 8/2014 | Tofte et al. | |
| 8,872,818 B2 | 10/2014 | Freeman et al. | |
| 8,874,454 B2 | 10/2014 | Plummer et al. | |
| 9,002,719 B2 | 4/2015 | Tofte | |
| 9,129,355 B1 | 9/2015 | Harvey et al. | |
| 9,262,789 B1 | 2/2016 | Tofte | |
| 9,390,489 B1 | 7/2016 | Harvey et al. | |
| 9,489,696 B1 | 11/2016 | Tofte | |
| 9,612,598 B2 | 4/2017 | Schultz et al. | |
| 9,633,146 B2 | 4/2017 | Plummer et al. | |
| 9,805,456 B1 | 10/2017 | Harvey et al. | |
| 10,102,584 B1 | 10/2018 | Devereaux et al. | |
| 10,163,162 B1* | 12/2018 | Devereaux | G06Q 50/16 |
| 10,311,302 B2 | 6/2019 | Kottenstette et al. | |
| 10,366,288 B1 | 7/2019 | Kottenstette et al. | |
| 10,643,072 B2 | 5/2020 | Kottenstette et al. | |
| 11,069,050 B1 | 7/2021 | Harvey et al. | |
| 11,151,378 B2 | 10/2021 | Kottenstette et al. | |
| 11,210,552 B2 | 12/2021 | Kossyk et al. | |
| 11,222,426 B2 | 1/2022 | Richter et al. | |
| 11,232,150 B2 | 1/2022 | Vianello et al. | |
| 11,367,265 B2 | 6/2022 | Vianello et al. | |
| 2006/0271695 A1 | 11/2006 | Lavian | |
| 2007/0070185 A1 | 3/2007 | Dy et al. | |
| 2007/0260401 A1 | 11/2007 | Sydor et al. | |
| 2009/0265193 A1 | 10/2009 | Collins et al. | |
| 2012/0033851 A1 | 2/2012 | Chen et al. | |
| 2012/0109690 A1 | 5/2012 | Weinrauch et al. | |
| 2013/0004017 A1 | 1/2013 | Medasani et al. | |
| 2013/0211790 A1 | 8/2013 | Loveland et al. | |
| 2014/0019166 A1 | 1/2014 | Swanson et al. | |
| 2014/0100889 A1 | 4/2014 | Tofte | |
| 2014/0245210 A1 | 8/2014 | Battcher et al. | |
| 2014/0259549 A1 | 9/2014 | Freeman et al. | |
| 2014/0270492 A1* | 9/2014 | Christopulos | G06V 20/39 382/159 |
| 2014/0278573 A1 | 9/2014 | Cook | |
| 2014/0278587 A1 | 9/2014 | Plummer et al. | |
| 2014/0320651 A1 | 10/2014 | Mcclatchie et al. | |
| 2014/0324483 A1 | 10/2014 | Plummer et al. | |
| 2014/0334689 A1 | 11/2014 | Butler et al. | |
| 2015/0019267 A1 | 1/2015 | Prieto et al. | |
| 2015/0073834 A1* | 3/2015 | Gurenko | G06Q 40/08 705/4 |

OTHER PUBLICATIONS

Brown et al., The use of remotely sensed data and ground survey tools to assess damage and monitor early recovery following the Dec. 5, 2008 Wenchuan earthquake in China, Bull. Earthquake Eng., 10:741-64 (2012).

Brunner et al., Earthquake damage assessment of buildings using VHR optical and SAR imagery, IEEE Transactions on Geoscience and Remote Sensing, vol. 8, No. 5 (May 2010).

Chen et al., Small-format fly-over photography for highway system monitoring, Proc. of SPIE, vol. 7647, 2010.

Gong et al., Road damage detection from high-resolution RS image, IGARSS 2012.

Jengo et al., Pothole detection and road condition assessment using hyperspectral imagery, ASPRS 2005 Annual Conference.

Li et al., "Study on road damage assessment based on RS and GIS," IGARSS 2010.

Liu et al., Object-oriented remote sensing image classification and road damage adaptive extraction, RSETE 2013.

Office Action issued in U.S. Appl. No. 14/510,307 dated Dec. 18, 2014.

Office Action issued in U.S. Appl. No. 14/510,307 dated Jun. 24, 2015.

Office Action issued in U.S. Appl. No. 14/510,307 dated Jun. 26, 2017.

Office Action issued in U.S. Appl. No. 14/510,307 dated May 20, 2016.

Office Action issued in U.S. Appl. No. 14/510,307 dated Nov. 19, 2015.

Office Action issued in U.S. Appl. No. 14/510,492 dated Feb. 2, 2016.

Office Action issued in U.S. Appl. No. 14/510,492 dated Jan. 18, 2018.

Office Action issued in U.S. Appl. No. 14/510,492 dated Jan. 8, 2015.

Office Action issued in U.S. Appl. No. 14/510,492 dated Jul. 12, 2016.

Office Action issued in U.S. Appl. No. 14/510,492 dated Jul. 15, 2015.

Office Action issued in U.S. Appl. No. 14/510,536 dated Dec. 23, 2015.

Office Action issued in U.S. Appl. No. 14/510,536 dated Jul. 6, 2015.

Office Action issued in U.S. Appl. No. 14/510,536 dated Jun. 27, 2017..

Office Action issued in U.S. Appl. No. 14/510,536 dated May 25, 2016.

Office Action issued in U.S. Appl. No. 14/510,536 dated Nov. 27, 2015.

Office Action issued in U.S. Appl. No. 14/510,784 dated Nov. 25, 2014.

Samadzadegan et al., "Earthquake destruction assessment of urban road network using satellite imagery and fuzzy interference systems," Proc. The International Archives of the Photogrammetry, Remote Sensing and Spatial Information Sciences, 2008, pp. 409-414.

(56) References Cited

OTHER PUBLICATIONS

U.S. Appl. No. 14/808,502, Nonfinal Office Action, dated Nov. 27, 2015.
U.S. Appl. No. 14/808,502, Notice of Allowance, dated Mar. 22, 2016.
U.S. Appl. No. 15/165,457, Notice of Allowance, dated Jul. 12, 2017.
U.S. Appl. No. 15/718,323, Nonfinal Office Action, dated Oct. 26, 2017.
U.S. Appl. No. 15/718,323, Notice of Allowance, dated Mar. 2, 2018.
U.S. Appl. No. 15/837,649, filed Dec. 11, 2017.
U.S. Appl. No. 15/966,086, Final Office Action, dated Aug. 3, 2020.
U.S. Appl. No. 15/966,086, Nonfinal Office Action, dated Mar. 30, 2020.
U.S. Appl. No. 15/966,086, Nonfinal Office Action, dated Nov. 16, 2020.
U.S. Appl. No. 15/966,086, Notice of Allowance, dated Mar. 17, 2021.
U.S. Appl. No. 16/831,401, Final Office Action, dated Jul. 20, 2022.
U.S. Appl. No. 16/831,401, Final Office Action, dated Oct. 5, 2021.
U.S. Appl. No. 16/831,401, Nonfinal Office Action, dated Dec. 1, 2022.
U.S. Appl. No. 16/831,401, Nonfinal Office Action, dated Jan. 28, 2022.
U.S. Appl. No. 16/831,401, Nonfinal Office Action, dated Mar. 19, 2021.
U.S. Appl. No. 14/510,307 entitled "Method and System for Determining the Condition of Insured Properties in a Neighborhood," filed Oct. 9, 2014.
U.S. Appl. No. 14/510,492 entitled "Method and System for Assessing Damage to Insured Properties in a Neighborhood," filed Oct. 9, 2014.
U.S. Appl. No. 14/510,536 entitled "Method and System for Generating Real-Time Images of Customer Homes During a Catastrophe," filed Oct. 9, 2014.
U.S. Appl. No. 14/510,784 entitled "Method and System for Assessing Damage To Infrastructure," filed Oct. 9, 2014.
Wang et al., An object-oriented method for road damage detection from high resolution remote sensing images, 19th International Conference on Geoinformatics, 2011.
Yamazaki, "Applications of remote sensing and GIS for damage assessment," In: ICUS/INCEDE Report 1, Joint Workshop on Urban Safety Engineering, Bangkok, 2001.
Mackie et al., "Performance-based earthquake assessment of bridge systems including ground-foundation interaction", Soil Dynamics and Earthquake Engineering 42 (2012) 184-196.
Thomas et al., "Automated poststorm damage classification of low-rise building roofing systems using high-resolution aerial imagery", IEEE Transactions on Geoscience and Remote Sensing, vol. 52, No. 7, Jul. 2014.
Carunnio et al., "EDCAR: a knowledge representation framework to enhance automatic video surveillance" Expert Systems with Applications, 131, (2019), 190-207.
Hongeng et al., "Video-based event recognition: activity representation and probabilistic recognition methods", Computer Vision and Image Understading 96, (2004), 129-162.

\* cited by examiner

METHOD AND SYSTEM FOR ASSESSING DAMAGE TO INFRASTRUCTURE

RELATED APPLICATIONS

This application is a continuation of and claims priority to U.S. application Ser. No. 16/831,401 filed on Mar. 26, 2020, entitled "Method and System For Assessing Damage To Infrastructure," which is a continuation of and claims priority to U.S. application Ser. No. 15/966,086 filed on Apr. 30, 2018, entitled "Method and System For Assessing Damage To Infrastructure," which is a continuation of and claims priority to U.S. application Ser. No. 15/718,323 filed on Sep. 28, 2017, entitled "Method and System For Assessing Damage To Infrastructure," which is a continuation of and claims priority to U.S. application Ser. No. 15/165,457 filed on May 26, 2016, entitled "Method and System For Assessing Damage To Infrastructure," which is a continuation of and claims priority to U.S. application Ser. No. 14/808,502 filed on Jul. 24, 2015, entitled "Method and System For Assessing Damage To Infrastructure," which is a continuation of and claims priority to U.S. application Ser. No. 14/510,784, filed on Oct. 9, 2014, entitled "Method and System For Assessing Damage To Infrastructure," the entire disclosures of each of which are hereby expressly incorporated by reference.

TECHNICAL FIELD

The present disclosure generally relates to a method and system for assessing damage to infrastructure such as roads, highways, bridges, etc.

BACKGROUND

Infrastructure such as roads, highways, bridges, etc., often becomes damaged over time due to wear and tear, natural disasters, extreme weather conditions, etc. To perform regular maintenance on the infrastructure, personnel may need to travel to the site to determine how to repair or replace the damaged infrastructure.

Often, the investigations can be time-consuming, difficult and even dangerous for the on-site personnel. For example, in order to investigate the damage to a highway, an inspector may have to travel to the highway and inspect the condition of the road. While a lane or section of the highway may be blocked off to prevent vehicles from passing by during the inspection, some vehicles may accidentally cross these barriers and crash into the inspectors performing the investigation, resulting in injuries or even death.

Even if the inspectors perform the investigation without getting injured, performing the full investigation may still be time-consuming. In addition to the time required to drive to and from the site and to perform the inspection itself, significant paperwork and calculations may be involved in calculating the cost of repairing the item of infrastructure. For example, if an inspector takes photos on the site to assess the amount of damage to the highway, the inspector may have to come back to her office, research the cost of the damaged infrastructure item and research repair costs. All of these steps are time consuming and both delay repairs and prevent the inspector from assessing damage to other items of infrastructure.

SUMMARY

To assess the extent or severity of the damage to infrastructure, an automated infrastructure evaluation system may identify an item of infrastructure for assessing damage. For example, a bridge, a road, a highway, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, a public transportation system, etc., may be identified. The infrastructure evaluation system may also determine boundaries for assessing the damage to the item of infrastructure. For example, if a stretch of Highway 80 from exit 220 to exit 225 is to be evaluated, the system may identify a set of boundaries (e.g., global positioning system (GPS) coordinates) which encapsulates the area between exit 220 and exit 225 on Highway 80.

Using the identified boundaries, the system may perform an automatic inspection of the infrastructure item. The automatic inspection may be performed by an unmanned aerial vehicle (UAV), or by a swarm of UAVs working together, which may be controlled by an inspector or by the system and flown within the specified boundaries to capture aerial images of the item. Alternatively, the automatic inspection may be performed by a satellite which also captures aerial images of the infrastructure item for the specified boundaries. Moreover, the inspection may also be performed by a manned aerial vehicle (MAV) which captures aerial images of the infrastructure item. Each captured aerial image may be associated with a location, for example a GPS location, and the GPS location may be used to aggregate the aerial images to form a 3-dimensional (3D) image.

The aerial images may also be analyzed to determine the condition of the infrastructure item as well as the extent or severity of the damage to the infrastructure item. Moreover, the system may assign an indicator (e.g., a color from a set of colors), which indicates the extent of the damage to the infrastructure item or to a specific portion of the infrastructure item. The system may also display the assigned indicator along with the infrastructure item on a computing device for a user, such as the inspector, to observe. In this manner, the damage assessment for infrastructure can be performed automatically, without requiring an inspector to spend her time and risk injury investigating the damage. Moreover, the system provides indicators to allow an inspector to quickly and easily view areas where the damage is most severe in order to determine costs and the necessary repairs for the severely damaged areas.

In an embodiment, a method for surveying a property using an unmanned aerial vehicle (UAV) is provided. The method includes identifying a commercial property for a UAV to perform surveillance, and directing the UAV to hover over the commercial property and capture aerial images at predetermined time intervals. Furthermore, the method includes receiving the aerial images of the commercial property captured at the predetermined time intervals, detecting a surveillance event at the commercial property, generating a surveillance alert, and transmitting the surveillance alert to an electronic device associated with an owner of the commercial property.

In another embodiment, a system for surveying a property using an unmanned aerial vehicle (UAV) is provided. The system includes one or more processors, a communication network, and a non-transitory computer-readable memory coupled to the one or more processors, and the communication network, and storing instructions thereon. When executed by the one or more processors, the instructions cause the system to identify a commercial property for a UAV to perform surveillance, and direct the UAV to hover over the commercial property and capture aerial images at predetermined time intervals. The instructions further cause the system to receive the aerial images of the commercial property captured at the predetermined time intervals, detect a surveillance event at the commercial property, generate a surveillance alert, and transmit the surveillance alert to an electronic device associated with an owner of the commercial property.

In yet another embodiment, a non-transitory computer-readable memory coupled to one or more processors and storing instructions thereon is provided. When executed by the one or more processors, the instructions cause the one or more processors to identify a commercial property for a UAV to perform surveillance, and direct the UAV to hover over the commercial property and capture aerial images at predetermined time intervals. The instructions further cause the one or more processors to receive the aerial images of the commercial property captured at the predetermined time intervals, detect a surveillance event at the commercial property, generate a surveillance alert, and transmit the surveillance alert to an electronic device associated with an owner of the commercial property.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
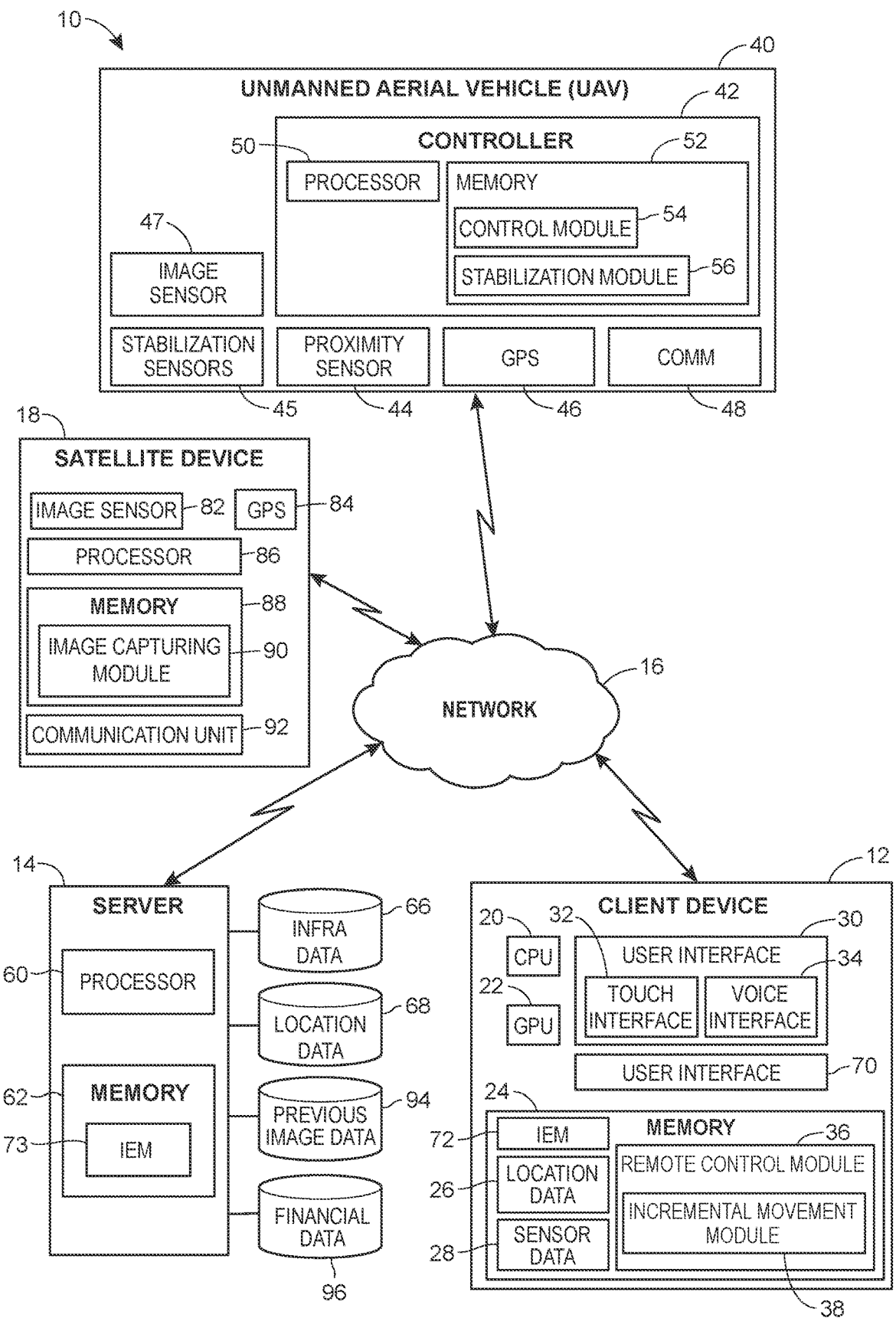
FIG. 1A illustrates a block diagram of an example system in which techniques for performing an automatic damage assessment of an item of infrastructure are implemented.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "aerial image" as used herein, may be used to refer to any image data within the electromagnetic spectrum (i.e. including the visible light spectrum as well as the invisible light spectrum), which is captured from an elevated position. Aerial images may include visible light imaging, radar imaging, near infrared imaging, thermal infrared imaging, hyperspectral imaging, multispectral imaging, full spectral imaging, etc. For example, an image captured by a satellite, a manned aerial vehicle (MAV) or an unmanned aerial vehicle (UAV) may be referred to herein as an "aerial image." An aerial image may be made up of data points, for example pixel data points, where each data point may correspond to a specific global positioning system (GPS) location. An aerial image may also include video captured from an elevated position.

Also, the term "infrastructure item" or "item of infrastructure" as used herein, generally refers to a physical component that provides commodities and/or services essential to enable, sustain, or enhance societal living conditions. An infrastructure item may include a highway, a road, a bridge, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, a public transportation system, etc., or any portion thereof. In some embodiments, items of infrastructure may not include buildings.

Generally speaking, to perform the automatic infrastructure evaluation process, an aerial image capturing device which may be a satellite, MAV, or one or several UAV(s) is/are directed to capture images within a specified set of boundaries which encapsulates an identified item of infrastructure (e.g., a highway segment between exit 10 and exit 20). The aerial image capturing device may be directed by a client device having user controls for determining the location and the amount of photographs or video captured. The captured aerial images may then be provided to the client device or to a server computer. The aerial images may be aggregated, for example using photogrammetry, stereoscopy, or LIDAR, to create a 3D image of the identified item.

The 2D or 3D image may be displayed on the client device and may be created at a predefined level of detail (e.g., accurate to within ten percent) and/or may be adjustable (e.g., a user of the system may be able to "zoom in" or "zoom out" of the image). Moreover, the 2D or 3D image may be made up of data points, for example pixel data points, where each data point may correspond to a specific global positioning system (GPS) location. Each of these data points may then be compared with other images of the same type of infrastructure for determining the condition of the infrastructure item depicted by the data points. For example, an image of a bridge may be compared to an image of a perfectly intact bridge. The condition may be used to determine the severity of the damage to the item of infrastructure or to a portion of the item of infrastructure. This damage severity level may be provided to an inspector, for example, on the user interface of the client device, for determining a cost of repair and/or replacement. Alternatively, the client device or the server computer may automatically determine the cost of repair and/or replacement based on the damage severity level and/or the aerial images.

FIG. 1A illustrates various aspects of an exemplary environment implementing an automated infrastructure evaluation system 10 (also referred to herein as "the system"). The system 10 may include a client device 12 with remote control capabilities coupled to one or several unmanned aerial vehicles (UAVs) 40, an MAV, a satellite device 18, and a server 14 via a communication network 16. The client device 12 may be, for example, a laptop computer, a tablet computer, a smartphone, a wearable device, etc. In the embodiment illustrated in FIG. 1A, the client device 12 may include a central processing unit (CPU) 20, a graphics processing unit (GPU) 22, a computer-readable memory 24, and a first user interface 30 for controlling the UAV(s) 40 or the satellite device 18. The first user interface 30 may include a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc. The client device 12 may further include a second user interface 70 which may be used for viewing aerial images captured by the UAV(s) 40, MAV, or the satellite device 18. In some embodiments, the first user interface 30 and the second user interface 70 may be implemented on one user interface which includes user controls for directing the UAV(s) 40 or the satellite device 18 and displays the aerial images after the aerial images have been captured.

The memory 24 is a computer-readable non-transitory storage device that may include both persistent (e.g., a hard disk) and non-persistent (e.g., RAM) memory components, stores instructions executable on the CPU 20 and/or the GPU 22 that make up an infrastructure evaluation module (IEM) 72, a remote control module 36 and location data 26 and sensor data 28 on which the remote control module 36 operates. The remote control module 36 includes an incremental movement module 38 that allows a user to easily control the UAV(s) 40 via step-like, incremental movements in which one incremental movement is in response to one single user command.

The remote control module 36 and the infrastructure evaluation module 72 according to various implementations operate as separately executable software applications, plugins that extend the functionality of another software application such as a web browser, application programming interfaces (API) invokable by a software application, etc. The instructions that make up the remote control module 36 and the infrastructure evaluation module 72 may be compiled and executable on the CPU 20 and/or the GPU 22 directly, or not compiled and interpreted by the CPU 20 at runtime. However, FIG. 1A merely illustrates a condensed version of the client device 12, and a more detailed version of the client device 12 is described below with reference to FIG. 1B.

Referring still to FIG. 1A, each UAV 40 includes a controller 42 that communicates with one or more proximity sensors 44, one or more stabilization sensors 45, a Global Positioning System (GPS) unit 46, image sensors 47, and a communications unit 48. The image sensors 47 may include one or more filters for infrared imaging, hyperspectral imaging, multispectral imaging, full spectral imaging, etc., or alternatively, the image sensors 47 may include one or more sensors which receive image data outside of the visible light spectrum such as an infrared image sensor. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating to avionics) to implement a control function, such as that associated with a control routine that performs PID (proportional-integral-derivative), fuzzy logic, nonlinear, etc. control to maintain the stability of the UAV(s) 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the remote aerial device 40 in a hover or stationary three dimensional position.

The control module 54 may retrieve data from the proximity sensors 44. These proximity sensors 44 may include any sensor or technique that assists the control module 44 in determining a distance and a direction to the infrastructure. The one or more proximity sensors 44 may include optic flow sensors, ultrasonic sensors, infrared sensors, LIDAR (Light Detection and Ranging), a stereo vision system (SVS) that may utilize the image sensors 47 (e.g., one or more cameras) to implement stereoscopic imaging techniques to capture aerial images of the infrastructure item and to create 3D images of the infrastructure item. The control module 54 may also receive instructions from the client device 12 to capture aerial images at specific locations or time intervals.

The GPS unit 46 may use "Assisted GPS" (A-GPS), satellite GPS, or any other suitable global positioning protocol or system that locates the position of the UAV(s) 40. Moreover, the GPS unit 46 may also determine the position of the aerial images or of data points within the aerial images captured by the UAV(s) 40, or the GPS may be combined with the distance and direction sensors 44 to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or wi-fi hotspots. The communication unit 48 may communicate with the server 14 or the client device 12 via any suitable wireless communication protocol network, such as a wireless telephony network (e.g., GSM, CDMA, LTE, etc.), a wi-fi network (802.11 standards), a WiMAX network, a Bluetooth network, etc.

As mentioned above, the system 10 may also include a satellite device 18 which includes an image sensor 82 for capturing aerial images and a GPS unit 84 for determining the position of each image. For example, the satellite device 18 may determine GPS coordinates of the boundaries of an aerial image, and also may determine GPS coordinates of data points, such as pixel data points, of the aerial image. The satellite device 18 may also include a processor 86 which executes instructions from a computer-readable memory 88 to implement an image capturing module 90, which may capture and transmit satellite images at the request of the client device 12. For example, the client device 12 may request satellite images between specified GPS coordinates, and the image capturing module 90 may transmit satellite images within the specified coordinates. Moreover, in some embodiments the client device 12 may specify the number of satellite images for the image capturing module 90 to capture and the zoom level. The client device 12 or the server 14 and the satellite device 18 may communicate via a communication unit 92 via any suitable wireless communication protocol network, such as a wireless telephony network (e.g., GSM, CDMA, LTE, etc.), a wi-fi network (802.11 standards), a WiMAX network, a Bluetooth network, etc.

The server 14 may include infrastructure data (e.g., a list of items of infrastructure such as "Highway 80," "the Golden Gate Bridge," "the 'L' Station," etc.), location data (e.g., locations of the items of infrastructure, locations of portions of the items of infrastructure, etc.), previous image data (e.g., aerial images of items of infrastructure taken at an earlier date), and financial data (e.g., infrastructure cost estimates of property and materials similar to those that were damaged or destroyed, labor costs for repairing/replacing the infrastructure, etc.) from an infrastructure database 66, a location database 68, a previous image database 94, and a financial database 96, respectively. The server 14 then may provide the infrastructure data, the location data, the previous image data, the financial data and appropriate indications of how certain portions of the infrastructure data and the location data are linked, to the client device 12 as part of the location data 26. The client device 12 may use this location data to determine a geographic location that the UAV(s) 40 is/are initially sent to and may use the previous image data to determine a condition of an item of infrastructure as compared to its previous condition. The financial data may be used for performing cost estimates for repairing infrastructure. The infrastructure database 66, the location database 68, the previous image database 94 and the financial database 96 may be disposed within the client device 12 depending on the implementation. The server may also include a processor 60 which executes instructions from a computer-readable memory 62 to implement an infrastructure evaluation module 73, which may be the same as the infrastructure evaluation module 72 of the client device 12. In some embodiments, the infrastructure evaluation module 72 may be disposed in the client device 12, in the server 14 or in a combination of the server 14 and the client device 12.

Figure 1B:
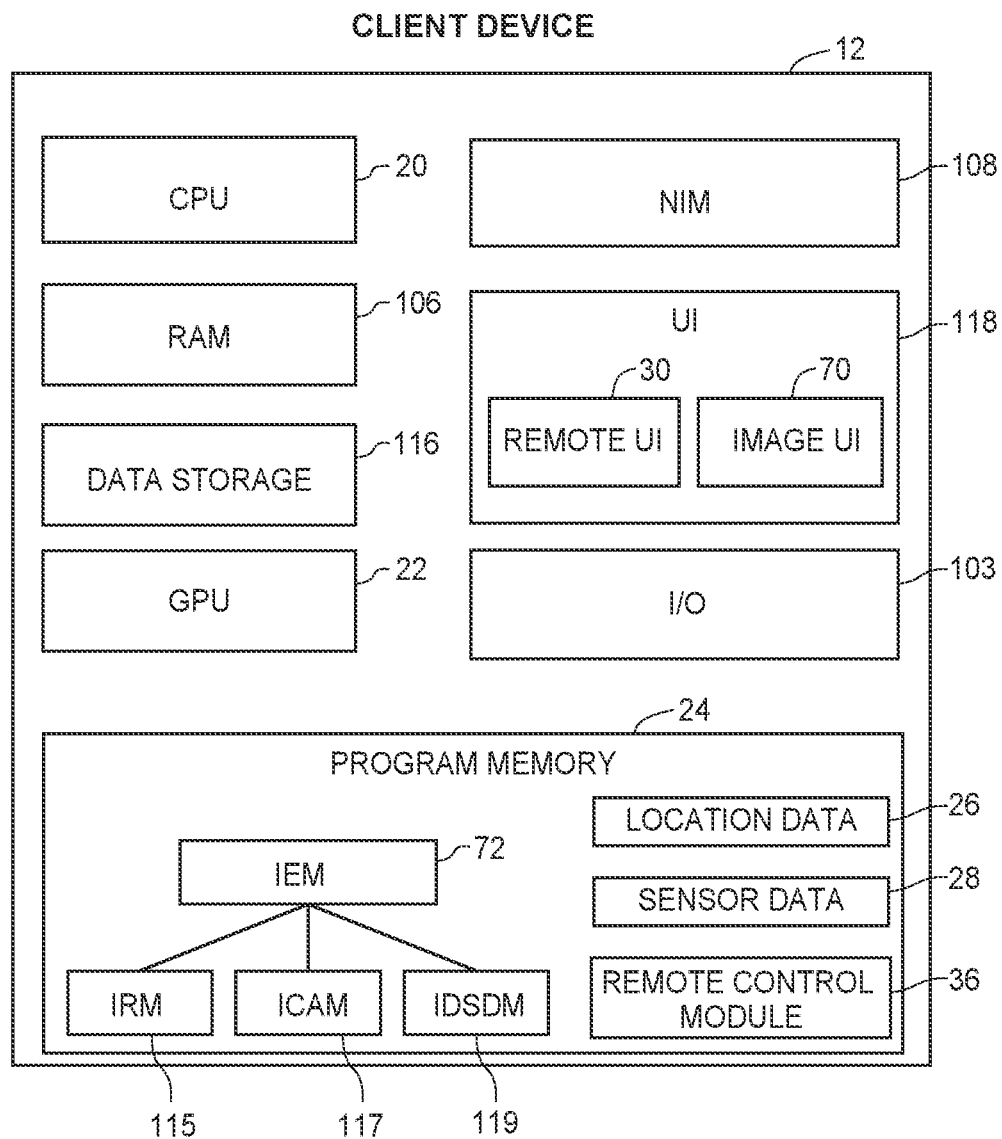
FIG. 1B illustrates a block diagram of an exemplary mobile device.

FIG. 1B illustrates the client device 12 of FIG. 1A in further detail. As illustrated in FIG. 1A, the client device may include a CPU 20, a GPU 22, and a memory 24 which may be a hard drive, an optical drive, a solid state memory device, or any other non-volatile memory device. The client device 12 may further include an input/output (I/O) unit 103 and a data storage 116, which may include infrastructure data, location data, previous image data, financial data, etc., which may be retrieved from software instructions which may be stored in the memory 24. During execution, the software instructions may be stored in, and may store and retrieve data from, a volatile or non-volatile memory source, such as a random access memory (RAM) 106. The client device 12 may include a network interface module (NIM) 108 for wired and/or wireless communications. The network interface module 108 may allow the device to communicate with one or more other devices such as the server 14, the satellite device 18, the MAV, or the UAV(s) 40 of FIG. 1A, by using one or more of any number of communications protocols including, by way of example and not limitation, Ethernet, cellular telephony, IEEE 802.11 (i.e., "Wi-Fi"), Fibre Channel, etc. The memory 24 may store an infrastructure evaluation module 72 as described above. The infrastructure evaluation module 72 may be a sub-routine of a software application or may be an independent software routine in and of itself. Alternatively, in some implementations, the infrastructure evaluation module 72 may be a hardware module or a firmware module. The infrastructure evaluation module 72 may include compiled instructions directly executable by the CPU 20, scripted instructions that are interpreted at runtime, or both.

The client device may also include a user interface (UI) 118 which includes the remote user interface 30 and the image user interface 70 of FIG. 1A. The remote user interface 30 may include user controls for directing the UAV(s) 40 to capture images, for requesting aerial images from the MAV or for requesting satellite images from the satellite device 18 at specific locations. On the other hand, the image user interface 70 may display aerial images of an infrastructure item and may also display damage severity levels for the infrastructure item.

The infrastructure evaluation module (IEM) 72 may contain one or more of an image receiving module (IRM) 115, an infrastructure condition assessment module (ICAM) 117, and/or an infrastructure damage severity determination module (IDSDM) 119. The IEM 72 may determine the severity of the damage (also referred to herein as a "damage severity level") associated with an item of infrastructure according to the presently described techniques. More specifically, the IEM 72 may automatically determine the condition of an item of infrastructure based on stored and received aerial images and/or other data describing items of infrastructure of the same type (e.g., if the item of infrastructure is a communications tower, the condition is determined based on stored images of communications towers). The aerial images may be stored in the memory 24 and/or RAM 106. In instances where the IEM 72 executes on a server device, the damage severity level for an item of infrastructure may be transmitted to the client device 12. Additionally, the IEM 72 may perform certain calculations on the server device 14 of FIG. 1A while other calculations are performed on the client device 12. Moreover, the memory 24, may also include a remote control module 36 and location data 26 and sensor data 28 on which the remote control module 36 operates as described above with reference to FIG. 1A.

Figure 2:
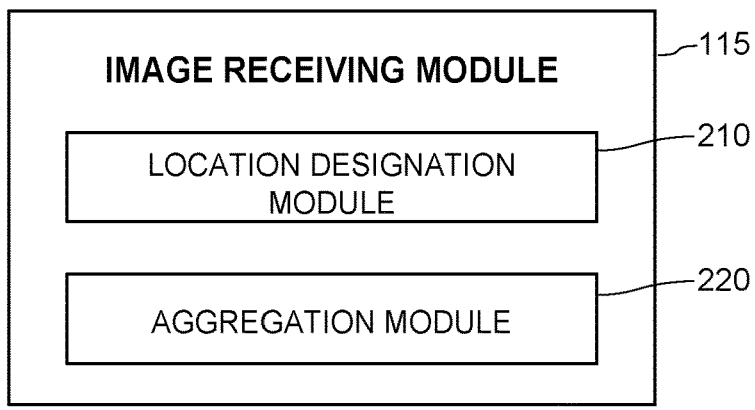
FIG. 2 illustrates a block diagram detailing an exemplary embodiment of an image receiving module.

FIG. 2 is a block diagram detailing an exemplary embodiment of the image receiving module 115 according to the present disclosure. The image receiving module 115 may include a location designation module 210, and an aggregation module 220. The location designation module 210, and the aggregation module 220 may be separate modules or may be combined and may interact with each other and/or with other software, hardware, and/or firmware.

The location designation module 210 may identify an item of infrastructure for assessing damage. To identify the item of infrastructure, the location designation module 210 may connect to a third-party server (not shown). The third-party server can include data from news sources (e.g., national news networks, regional news networks, newspapers, magazines, news websites, and others), data from weather sources (e.g., the National Oceanic and Atmospheric Administration; other federal, state, or local governmental weather bureaus; commercial weather services; weather websites; and others), data from governmental sources (e.g., the Department of the Interior, the Department of Homeland Security, other federal, state, and local governmental sources, and others), data from social networks (e.g., Facebook®, Twitter®, Google+®, Instagram®, and others), data from public databases, data from private databases (e.g., consultants, data miners, surveyors, and others), crowd sourced weather data (e.g., connected users or user devices may report extreme weather conditions to a central server) or other sources. The location designation module 210 may then use this data to determine geographic locations where damage to infrastructure is likely to have occurred, and may identify an item(s) of infrastructure within the determined geographic locations, for example, using the location database 68 of FIG. 1A. Moreover, in some embodiments the user of the client device 12 such as an inspector, may input a name of an item of infrastructure or a portion thereof such as "Golden Gate Bridge" or "Route 66 in Illinois between exit 40 and exit 102" into the client device 12 which may be provided to the location designation module 210.

In any event, when the infrastructure item is identified, the infrastructure evaluation module 72 may request and/or receive aerial images of the identified infrastructure item. For example, the infrastructure evaluation module 72 may receive the aerial images of the identified item from the satellite device 18 of FIG. 1A, the MAV, or from the UAV(s) 40. The aerial images may be received from the UAV(s) 40 by automatically directing the one or several UAV(s) 40 to fly within the set of boundaries which encapsulate the identified item. For example, the infrastructure evaluation module 72 may look up the location of the identified infrastructure item in the location database 68 to determine the appropriate set of boundaries. The UAV(s) 40 may also be directed to take several photographs or capture video at different locations surrounding the infrastructure item and at several angles. Alternatively, after the infrastructure item is identified, a user such as an inspector may control the UAV(s) 40 remotely, through a series of user controls on the remote user interface 30 to cause the UAV(s) to take pictures at different locations surrounding the infrastructure item and at several angles.

After the aerial images are captured and received for the identified infrastructure item, the infrastructure evaluation module 72 may combine the aerial images using an aggregation module 220. The aerial images may be combined to generate a 3D image of the infrastructure item using 3D imaging techniques such as LIDAR, stereoscopy, or photogrammetry. The aggregation module 220 may utilize the Cartesian or GPS coordinates received with each aerial image to reconstruct a 3D image of the infrastructure item using the aerial images captured at different locations and angles. In some embodiments, the 3D aerial image may be created at a predefined level of detail (e.g., accurate to within ten percent) and/or may be adjustable (e.g., a user or the system may be able to "zoom in" or "zoom out")

Figure 3:
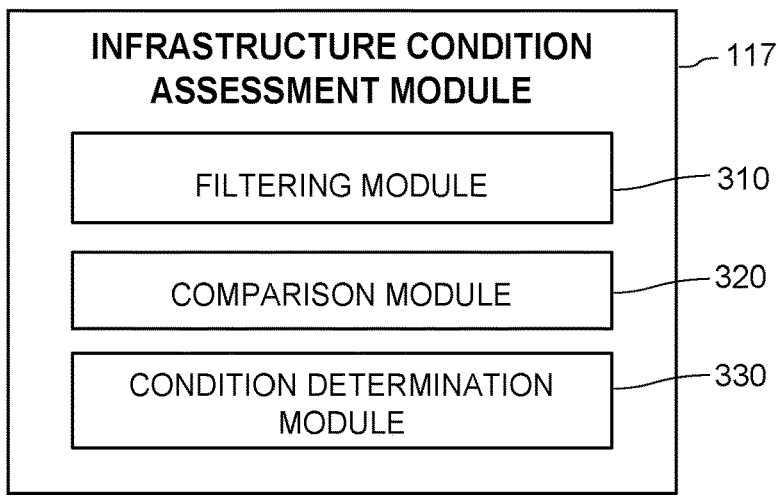
FIG. 3 depicts a block diagram detailing an exemplary embodiment of an infrastructure condition assessment module.

FIG. 3 is a block diagram detailing an exemplary embodiment of the infrastructure condition assessment module 117. The infrastructure condition assessment module 117 may include a filtering module 310, a comparison module 320 and a condition determination module 330. In some embodiments, the infrastructure condition assessment module 117 may obtain a 3D aerial image of an infrastructure item and determine the condition of the item. In other embodiments, the condition assessment module 117 does not obtain 3D aerial images and instead obtains 2D aerial images. Moreover, in some embodiments, the 3D aerial image may be obtained from the image receiving module 115.

In any event, the filtering module 310 may analyze the received aerial images and filter out (i.e., remove from consideration for further analysis) one or more irrelevant and/or unexpected data points. For example, if the damage assessment is for a road, the aerial images may include data points which display the road as well as data points where damage assessment does not need to be performed (e.g., data points depicting nearby side streets, and surrounding terrain such as grass, mountains, bodies of water, the sky, trees, etc.). The filtering module 310 may remove the unnecessary data points, so that the unnecessary data points are not included and/or considered in the damage assessment for the road. Various image processing techniques such as edge detection may be used by the filtering module 310 for determining the unnecessary data points of an aerial image(s).

Once the filtering module 310 removes the unnecessary data points from the aerial images, the remaining data points may be compared with another predefined infrastructure item using the comparison module 320. The comparison module 320 may compare the data points of the infrastructure item with data describing a predefined infrastructure item of the same type. If the infrastructure item is a bridge, for example, the comparison module 320 may compare data extracted by the filtering module 310 with previously stored images of an intact bridge. Based on these comparisons, the comparison module 320 may determine physical differences between the bridge depicted by the data points and the intact bridge. For example, the comparison module 320 may determine that the bridge differs in color (e.g., due to rusting), thickness (e.g., due to cracks or dents in the surface), and/or in shape (e.g., due to structural damage to the bridge) from the intact bridge.

Moreover, the comparison module 320 may also compare the data points depicting a bridge with a previously stored image(s) of the same bridge, for example, from five years ago when the bridge was known to be in good condition. The previously stored image(s) of the same bridge may be obtained from the previous image data 94 stored at the server 14 or the client device 12 of FIG. 1A. After an aerial image of an item of infrastructure is captured, the aerial image may be stored in the previous image data 94, so that it may be compared with a newly captured image of the same infrastructure item at a later date. In this manner, the degradation/maintenance of an infrastructure item may be determined over time for a more detailed analysis of the damage.

In addition to comparing data points, the comparison module 320 may compare a set of data points which make up a component of an infrastructure item to a previously stored image of the same component. For example, a set of data points may display a deck of a bridge, the shoulder on a highway, etc. The entire set may then be compared to data displaying, for example, a highway shoulder in good condition to determine physical differences between the set of data points and the data displaying the highway shoulder.

After comparisons have been made for the infrastructure item, a condition determination module 330 may determine the conditions of various portions of the infrastructure item. Conditions may include condition categories such as "poor," "fair," "moderate," "good," "excellent," etc., or may include numerical condition scores, for example from a scale of one to one hundred. For example, a portion of a bridge having dents and cracks may be determined to be in poor condition.

In addition to determining conditions of various portions of the infrastructure item, the condition determination module 330 may determine the size of a portion of the infrastructure item which requires repair. For example, the condition determination module 330 may determine a portion of the bridge is in "poor" condition, because it is dented. Moreover, the condition determination module 330 may determine the size of the dent based on the GPS coordinates of an aerial image depicting the bridge. This information may be used to determine the cost of repairing the dent.

Figure 4:
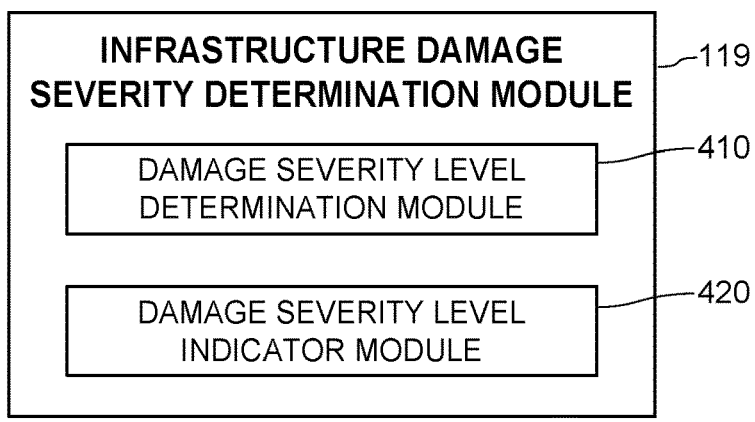
FIG. 4 depicts a block diagram detailing an exemplary embodiment of an infrastructure damage severity determination module.

Each data point along with the respective determined condition may then be provided to the infrastructure damage severity determination module 119 as depicted in FIG. 4. The infrastructure damage severity determination module 119 may include a damage severity level determination module 410, and a damage severity level indicator module 420. The damage severity level determination module 410 may determine that a data point or a set of data points belongs to a particular damage severity level category from a set of damage severity level categories. For example, the set of damage severity level categories may include "light damage," "moderate damage," "severe damage," "total loss," "no loss," "very light damage," etc. In other embodiments, the damage severity determination module 410 may determine a score for each data point, such as a numeric percentage representing the amount of damage to the portion of the infrastructure item represented by the data point. For example, the damage severity determination level module 410 may determine 100 percent damage to a bridge deck which has split in half and thus needs to be completely replaced. On the other hand, the damage severity determination level module 410 may determine 50 percent damage to a large crack or pothole in the road, which can be repaired and does not need to be replaced. In some embodiments, the damage severity level determination module 410 may determine a damage severity level category based on the numeric percentage representing the amount of damage to the portion of the infrastructure item represented by the data point. For example, the damage severity level determination module 410 may determine portions of infrastructure items having less than 20 percent damage or some other predetermined damage threshold are within the "light" category, portions of infrastructure items having between 20 and 50 percent damage are within the "moderate" category and portions of infrastructure items having more than 50 percent damage are within the "severe" category.

The damage severity level determination module 410 may determine the amount of damage based on the condition of the portion of the infrastructure item. For example, there may be a higher amount of damage determined for a bridge in poor condition than a bridge in excellent condition. The amount of damage may also be determined based on whether a portion of the infrastructure item needs to be replaced or can be repaired. Portions of infrastructure items requiring replacement may correspond to a higher amount of damage than portions of infrastructure items requiring repair. The damage severity level determination module 410 may include a set of rules for determining whether a particular portion of an infrastructure item needs to be repaired or can be replaced based on its condition. For example, suspension cables on a bridge in poor condition may need to be replaced whereas a portion of a road in the same poor condition may be repaired. The damage severity level may then be determined based on the amount of damage, as described above.

Once the damage severity level is determined for each data point or each set of data points, the damage severity level indicator module 420 may assign a damage severity level indicator to the data point or a set of data points. For example, each damage severity level category from the set of damage severity level categories may be assigned a respective damage severity level indicator. In some embodiments, the damage severity level indicator may be a color selected from a set of colors. More specifically, the "moderate" damage severity level category may correspond to the color yellow, for example. Moreover, the "severe" damage severity level category may correspond to the color red, and the "light" damage severity level category may correspond to the color green. In other embodiments, a range of damage severity level percentages may be assigned a damage severity level indicator. For example, damage severity level percentages less than 20 percent may correspond to the color green. The corresponding damage severity level indicators may then be assigned to each data point based on the determined damage severity level for the data point. For example, a set of data points representing a portion of a road with moderate damage may be assigned the color yellow. An assigned damage severity level indicator for a set of data points may then be appended to one or more aerial images which may be 3D aerial images and which display the corresponding data points. For example, an aerial image displaying the portion of the road may display the color yellow overlaying the portion of the road.

While the damage severity level indicators are described as the colors red, green and yellow, the indicators are not limited to those particular colors. Instead, the damage severity level indicators may include any color and also may include any other suitable representation of a damage severity level. For example, damage severity level indicators may include numbers which are placed over each data point or set of data points, labels, symbols, different shading techniques, etc.

The aerial images which display infrastructure items and include damage severity level indicators may then be displayed on the client device 12 for an inspector to view. In some embodiments, the client device 12 may display a 3D aerial image of an infrastructure item with damage severity level indicators overlaying the image. Moreover, in some embodiments, the client device 12 may display several aerial images for a infrastructure item and include the damage severity level indicators in each aerial image.

In some embodiments, the infrastructure evaluation module 72 may include a set of rules for determining a cost estimate based on the damage severity levels of the various portions or components of an infrastructure item. For example, the infrastructure evaluation module 72 may determine a cost estimate for repairing or replacing portions of infrastructure items based on corresponding damage severity levels. In some embodiments, the set of rules may include a table with a predetermined cost estimate for the different types of infrastructure items as well as their respective quality (e.g., bridges may be more expensive to repair than highways), size (e.g., based on square footage) and damage severity level. For example, the set of rules may include a cost estimate of $50,000 for a small road with moderate damage. The set of rules may be stored in the financial database 96. Cost estimates for each portion of an infrastructure item may be aggregated and/or combined to determine an overall cost estimate for repairing the damage to the infrastructure item. In other embodiments, an inspector or a user of the client device 12 may view the damage severity levels of the various portions or components of an infrastructure item and determine the appropriate cost estimate for repair. In addition to cost estimates, the damage severity levels may also be used to determine whether further inspection may be necessary, whether a road, highway, bridge, etc., may be closed for an extended period of time for construction/repairs, etc.

Figure 5:
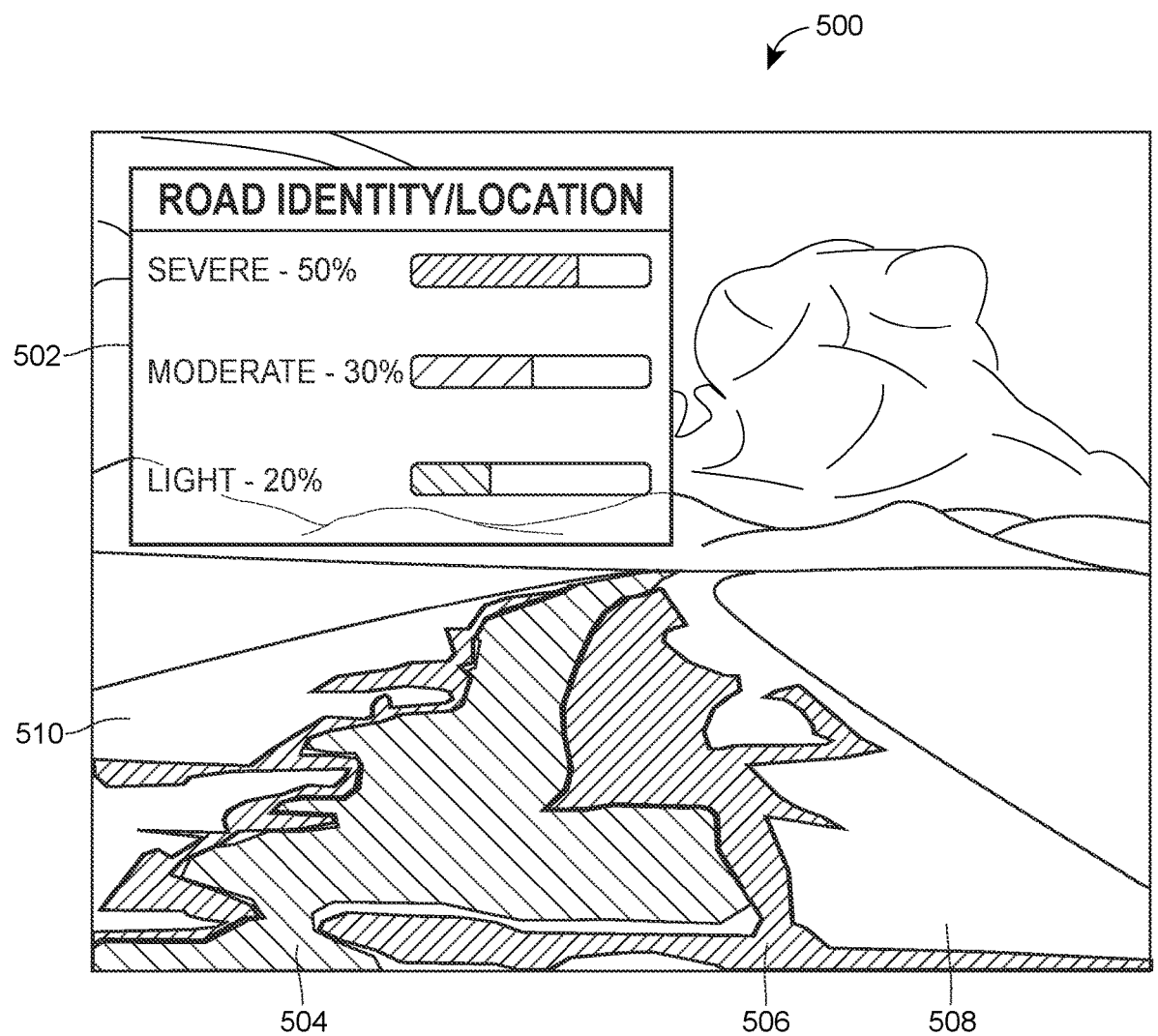
FIG. 5 depicts an exemplary display of an infrastructure item including damage severity level indicators.

FIG. 5 illustrates an exemplary display 500 of an aerial image of a road including damage severity level indicators. In some embodiments, the display 500 may be presented on the image user interface 70 of the client device 12 of FIG. 1A. In other embodiments, the display may be presented on another computing device. The display 500 may include a legend 502 which explains the meaning of each damage severity level indicator present on the display 500. For example, the legend 502 explains a red color indicates "severe" damage (50 percent damage), a yellow color indicates "moderate" damage (30 percent damage), and a green color indicates "light" damage (20 percent damage). In some embodiments, the green color may indicate less than 20 percent loss, the yellow color may indicate between 20 and 50 percent loss and the red color may indicate more than 50 percent loss.

Additionally, the display 500 may include a road 510 as well as terrain surrounding the road, such as grass, mountains, the sky, clouds, etc. Data points depicting the terrain surrounding the roads may be filtered out by the filtering module 310 of FIG. 3 during the comparison stage. On the other hand, the data points depicting the road 510 may be compared to a previously stored image of the road 510 or a road in good condition to determine conditions of portions of the road 510 and resulting damage severity levels. Based on this comparison, a first portion of the road 504 near the center has a green damage severity level indicator, indicating that the center of the road has experienced "light" damage. Surrounding the center of the road, a red damage severity level indicator overlays a second portion 506, indicating that the second portion surrounding the center has experienced "severe" damage. This may be because of large dents or potholes in the pavement. Thus, the second portion 506 may require extensive repairs, whereas the first portion may not require any repairs and instead may require further inspection at a later date. However, in some embodiments, the amount of repairs may also depend on the item of infrastructure. For example, a tunnel may require replacement when experiencing "severe" damage, while a road may require repair when experiencing the same amount of loss. Moreover, surrounding the second portion 506 is a third portion 508 of the road 510 which does not include a damage severity level indicator. The third portion 508 may not have experienced any damage and therefore may not require any repairs or further inspection.

The aerial image on the display 500 may be just one of several images of the road 510. Moreover, while the display 500 depicts a small section of the road 510 which ends at a bend, other aerial images may display additional sections taken at different angles, locations, and/or zoom levels than the display 500. The other aerial images may be combined and/or aggregated to display a larger section of the road 510 depicting several bends.

A user such as an inspector or the infrastructure evaluation module 72 may determine the amount of damage to each portion of the infrastructure item to calculate a cost estimate and combine the cost estimates for the portions to determine an overall cost estimate for repairing/replacing the infrastructure item. Moreover, the user may also determine the amount of damage to each portion to determine whether a road, highway, bridge, etc., may be closed for an extended period of time for construction/repairs, etc.

Figure 6:
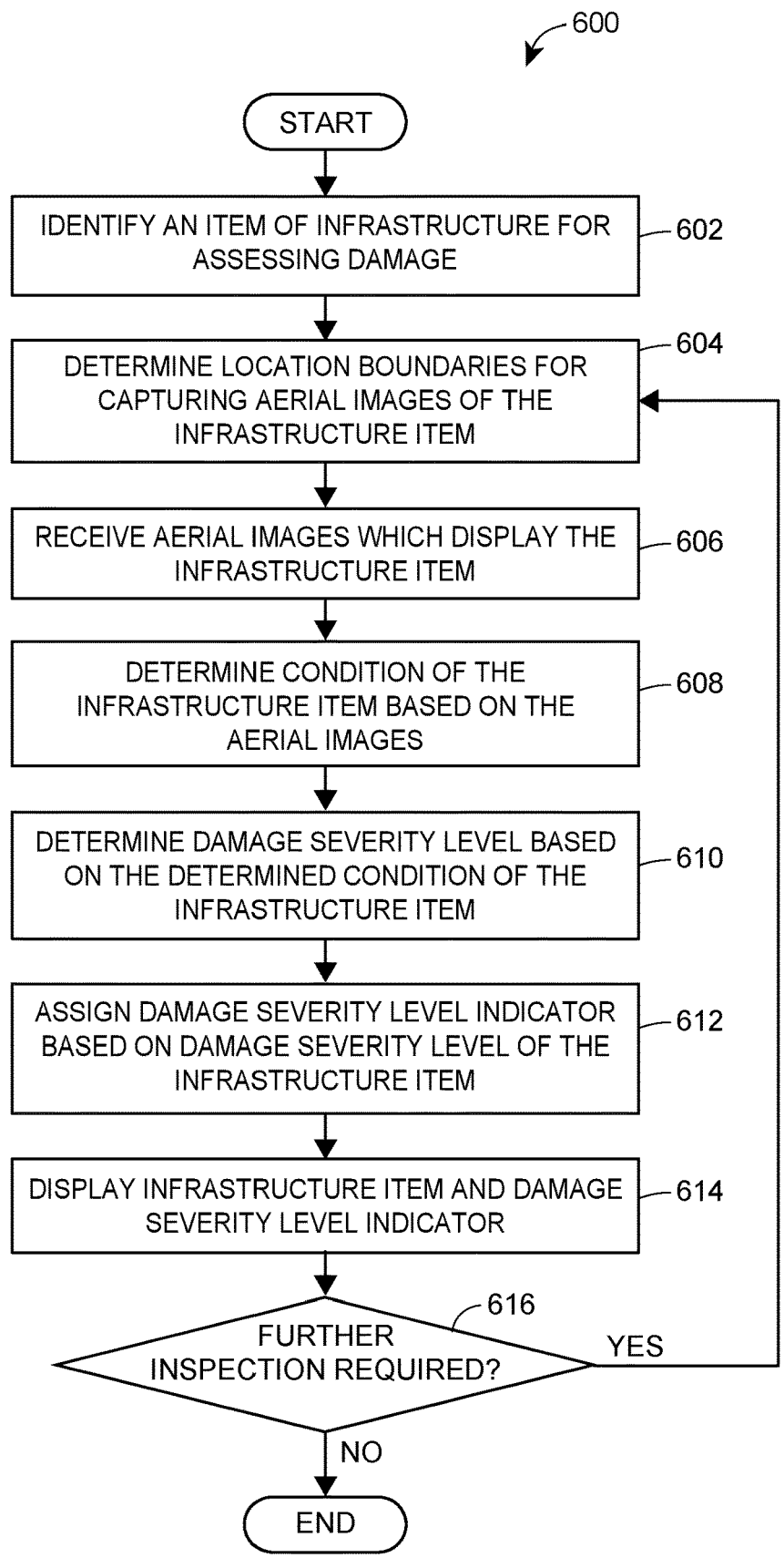
FIG. 6 illustrates a flow diagram representing an exemplary method for performing automatic damage assessment of an item of infrastructure in accordance with the presently described embodiments.

FIG. 6 illustrates a flow diagram representing an exemplary method 600 for performing an automatic damage assessment of an item of infrastructure. The method 600 may be executed on the client device 12, the server computer 14 or some combination of the client device 12 and the server computer 14. For example, at least a portion of the method 600 may be performed by the infrastructure evaluation module 72 of FIG. 1A which as mentioned above, may be disposed on the client device 12, the server computer 14 or some combination of the client device 12 and the server computer 14. In an embodiment, the infrastructure evaluation module 72 may include computer-executable instructions stored on one or more non-transitory, tangible, computer-readable storage media or devices, and the computer-executable instructions of the infrastructure evaluation module 72 may be executed to perform the method 600.

At block 602, an item of infrastructure may be identified for assessing damage. For example, the item of infrastructure may be a highway, a road, a bridge, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, or a public transportation system. Then, location boundaries for capturing aerial images of the item of infrastructure may be determined (block 604). For example, the location boundaries may be GPS coordinates which encapsulate the identified item of infrastructure. The location boundaries may be determined by looking up the location of the identified infrastructure item in the location database 68.

At block 606, aerial images which display the infrastructure item may be received. The aerial images may be received from the satellite device 18, the MAV, or the UAV(s) 40 of FIG. 1A. In some embodiments, user controls may be disposed on the client device 12 which allow a user, such as an inspector, to control the UAV(s) 40 remotely and determine when and where to capture aerial images. In other embodiments, the UAV(s) 40 may be preprogrammed to capture aerial images between the specified location boundaries. Moreover, in some embodiments, the set of aerial images may be aggregated to form a 3D display of the infrastructure item. For example, the set of aerial images may be aggregated using LIDAR, stereoscopy, or photogrammetry techniques to create the 3D image.

At block 608, the infrastructure evaluation module 72 may determine the condition of the infrastructure item based on the aerial images. In some embodiments, the aerial images which depict the infrastructure item may be made up of data points and a condition may be determined for each data point, or alternatively, for each set of data points. The condition may be determined by filtering out data points which do not depict the infrastructure item and comparing the remaining data points to data depicting a previous image of the infrastructure item taken while the infrastructure item was in good condition. Additionally, the condition may be determined by comparing the remaining data points to data depicting a similar infrastructure item in good condition and identifying differences between the two.

Based on the condition of the infrastructure item, a damage severity level may be determined (block 610). For example, a damage severity level score or a damage severity level category may be determined for each of the data points depicting the infrastructure item. The damage severity level score or category may be determined for a data point based on the determined condition of a portion of the infrastructure item depicted by the data point. A damage severity level indicator may then be assigned to the infrastructure item based on the determined damage severity level (block 612). For example, data points depicting a portion of an infrastructure item having "light damage" may be assigned a green color indicator. Moreover, in some embodiments, the damage severity level indicators may overlay the aerial images of the infrastructure item on a display, for example, on the client device 12 (block 614). In addition to placing the damage severity level indicators over the aerial images of the infrastructure item, a cost estimate for repairing and/or replacing the infrastructure item may be determined. For example, the damage severity level for a particular portion of the infrastructure item may be compared with a set of rules which includes cost estimates based on the type of infrastructure item, the quality of the infrastructure item, the size of the portion of the infrastructure item, and/or the damage severity level. Cost estimates for portions of the infrastructure item may be aggregated and/or combined to determine a total cost estimate for repairing the damage to the infrastructure item.

Furthermore, as described above, in some embodiments, items of infrastructure may require further inspection, for example, when the damage severity level is "light damage." When further inspection is required (block 616), the method steps 604 to 614 may be repeated, and the infrastructure evaluation module 72 may direct the UAV(s) 40, MAV or satellite device 18 to capture additional aerial images until further inspection is no longer necessary. In other embodiments, the infrastructure evaluation module 72 may direct a person such as an inspector to go to the site and manually inspect the infrastructure item.

To perform underwriting of insured or potentially insured properties in a neighborhood, an automated insurance underwriting system may identify a neighborhood with a large concentration of properties which are insured or potentially insured by an insurance company. For example, the system may identify a neighborhood where over 20 percent of the properties within the neighborhood are either insured or potentially insured by the insurance company. Once the neighborhood is identified, the system may perform all insurance underwriting for the properties in a single, automatic inspection, for example by automatically surveying the entire neighborhood at once, instead of one property at a time.

The automatic inspection may be performed by an unmanned aerial vehicle (UAV) or by a swarm of UAVs working together, which may be controlled by an insurance agent or by the system and flown all over the neighborhood to capture aerial images of the properties. Alternatively, the automatic inspection may be performed by a satellite which also captures aerial images of the properties within the neighborhood. Moreover, the inspection may also be performed by a manned aerial vehicle (MAV) which captures aerial images of the properties while flying over the neighborhood. Each captured aerial image may be associated with a location, for example a GPS location, and the GPS location may be used to determine the owner of the property which is displayed in the captured aerial image. If the property owner is insured by the insurance company, the aerial image may be used to determine the condition of the property as well as a level of risk associated with the property. In this manner, the underwriting can be performed for an insured property without requiring an insurance agent to spend time and risk injury by inspecting the property. Moreover, the system provides a speedy and efficient method of performing underwriting by investigating an entire neighborhood in one inspection rather than investigating one insured property at a time.

Generally speaking, to perform the automatic underwriting process, an aerial image capturing device which may be a satellite, MAV, or one or several UAV(s) is/are directed to capture images within an identified neighborhood having a large percentage of properties which are insured by an insurance provider. The aerial image capturing device may be directed by a client device having user controls for determining the location and the amount of photographs or video that is captured. The captured aerial images may then be provided to the client device or to a server computer and grouped based on their GPS locations to determine a group of aerial images which correspond to an insured property. Each group of aerial images corresponding to an insured property may be aggregated, for example using photogrammetry, to create a 3-dimensional (3D) image of the insured property.

The 2D or 3D image may be displayed on the client device and may be created at a predefined level of detail (e.g., accurate to within ten percent) and/or may be adjustable (e.g., a user of the system may be able to "zoom in" or "zoom out" of the image). Moreover, the 2D or 3D image may be broken down into property components, such as a roof, a door, siding, an exterior wall, a front lawn, a backyard, an outdoor swimming pool, a fence, a tree, a deck, a patio, etc. Each of these property components may then be compared to other images of the same respective property component for determining the condition of the component. For example, an image of the roof may be compared to an image of the roof taken ten years ago or to an image of a perfectly intact roof. The condition of each property component may be used to determine a level of risk associated with the component. Moreover, the level of risk may be determined independently of the condition of the property component. For example, a house with a swimming pool may create some risk of liability regardless of the condition of the swimming pool. The level of risk of each property component may be aggregated or combined for an insured property to determine an overall level of risk for the property. This overall level of risk may be provided to an insurance agent, for example, on the user interface of the client device for determining an appropriate insurance premium based on the level of risk. Alternatively, the client device or the server computer may automatically determine an appropriate insurance premium based on the determined overall level of risk.

Each group of aerial images which displays the same insured property may be combined using an aggregation module. The group of aerial images may be combined to generate a 3D image of the insured property using 3D imaging techniques such as stereoscopy or photogrammetry. The aggregation module may utilize the Cartesian or GPS coordinates received with each aerial image to reconstruct a 3D image of the insured property using the group of aerial images captured at different locations and angles. The aggregation module may combine each group of aerial images to generate a 3D aerial image of each insured property in the neighborhood.

In some embodiments, the condition assessment module may obtain a 3D aerial image of an insured property and determine the condition of the insured property. In other embodiments, the condition assessment module does not obtain 3D aerial images and instead obtains 2D aerial images. Moreover, in some embodiments, the 3D aerial image may be obtained from the image receiving module. The condition assessment module may obtain one 3D aerial image of an insured property at a time or alternatively may obtain several 3D aerial images depicting each of the insured properties in a neighborhood.

In any event, the component recognition module may determine property components of a 3D aerial image of an insured property. Property components may include a roof, a door, a window, siding, exterior walls, a lawn, a backyard, an outdoor swimming pool, a fence, a tree, a deck, a patio, etc. The component recognition module may determine a portion of the 3D aerial image of the insured property which displays a particular property component. For example, the component recognition module may determine a door of the insured property by determining the data points in the 3D aerial image which include the door. Various image processing techniques such as edge detection may be used by the component recognition module for determining the data points of a 3D aerial image which depict a particular property component.

Once the property components are determined for a 3D aerial image or for several 3D aerial images in a neighborhood, each property component may be compared with other predefined property components using the comparison module. The comparison module may compare the data points of a property component with data describing one or more predefined property components corresponding to the same property component. If the property component is a roof, for example, the comparison module may compare data extracted by the component recognition module with previously stored images of brand-new "stock" tiles and of an intact roof. Based on these comparisons, the comparison module may determine physical differences between the roof depicted in the data points and the stock components (e.g., brand new roof tiles). For example, the comparison module may determine that the data points depicting the roof differ in color (e.g., due to weather aging), thickness (e.g., due to cracks or dents in the surface), and/or in height/width (e.g., due to chipping on one or more edges) from the brand-new "stock" tiles.

Moreover, the comparison module may also compare the data depicting a roof with a previously stored image of the same roof, for example, from five years ago. The previously stored image of the same roof may be obtained from the previous image data stored at the server or the client device. After an aerial image of insured property is captured, the aerial image may be stored in the previous image data, so that it may be compared with a newly captured image of the same property at a later date. In this manner, the degradation/maintenance of an insured property or of a property component may be determined over time for a more detailed analysis of the level of risk of the insured property. Moreover, the aerial images may display the presence of new rooms or structures which were not present in the previous aerial images of the insured property. This may allow the system to detect additional risk as compared to the previous state of the insured property during the re-underwriting process. Comparing the newly captured images of the insured property to previously captured images may also allow the system to determine the age of property components, e.g., the aerial images may display the roof being replaced ten years ago.

After comparisons have been made for each property component in an insured property or in a neighborhood, a condition determination module may determine the condition of each property component based on the comparison. Conditions may include condition categories such as "poor," "fair," "moderate," "good," "excellent," etc., or may include numerical condition scores, for example from a scale of one to one hundred. For example, with reference to the roof example described above, a roof having several cracks or dents in the surface may be determined to be in poor condition.

Each property component along with the respective condition determined for each property component may then be provided to a risk determination module. The risk determination module may include a level of risk determination module, and a risk indicator module. The level of risk determination module may determine that a property component belongs to a particular level of risk category from a set of level of risk categories. For example, the set of level of risk categories may include "low," "moderate," "high," "liability," "very low," "very high," etc. In other embodiments, the level of risk determination module may determine a level risk score for a property component, such as a numeric level of risk score on a scale from one to ten.

In any event, the level of risk determination module may determine the level of risk for a property component based, at least in part, on the condition of the property component. For example, a door in poor condition may have a higher level of risk than a door in excellent condition. However, the condition of the property component may not be the only factor considered by the level of risk determination module for determining the level of risk. The maintenance of the property component may also be used for determining its level of risk. For example, a roof in moderate condition that has been in the same moderate condition for 15 years and has not worsened may have a lower level of risk than a roof in moderate condition for the first time. On the other hand, the level of risk may be higher for the roof that has been in moderate condition for 15 years because it may be more likely that the roof will be downgraded to poor condition than the roof in moderate condition for the first time. The type of property component may also be a factor for determining the level of risk, regardless of the property component's condition. For example, a swimming pool may pose a high level of risk even if it is kept in excellent condition, because of the liability risk associated with a swimming pool. Moreover, a gas line in a home or a forest in a backyard may pose fire risks even when they are properly maintained. However, this is merely an exemplary list of factors which may be considered by the level of risk determination module for determining the level of risk. Any number of additional factors may also be considered and some of the factors mentioned above may be omitted by the level of risk determination module. In some embodiments, the level of risk determination module may include a set of rules which may be used for each property component to determine its level of risk. The set of rules may include the factors mentioned above or any number of additional factors. In some embodiments, the set of rules may include combining and/or aggregating the factors which are applied to a property component to determine a level of risk for the property component. In an embodiment, the set of rules may be determined based on heuristics, best practices and/or statistical data.

In any event, once the level of risk is determined for each property component or alternatively once the level of risk is determined for a single property component, the risk indicator module may assign a level of risk indicator to each property component. For example, each level of risk category from the set of level of risk categories may be assigned a respective level of risk indicator. More specifically, the "moderate" risk category may correspond to the color yellow, for example. Moreover, the "high" risk category may correspond to the color red, and the "low" risk category may correspond to the color green. In other embodiments, a range of level of risk scores may be assigned a level of risk indicator. For example, level of risk scores between 1 and 3 may correspond to the color green. The corresponding level of risk indicators may then be assigned to each property component based on the determined level of risk for the property component. For example, a piece of siding with a moderate level of risk may be assigned the color yellow. An assigned level of risk indicator for a property component may then be appended to one or more aerial images which may be 3D aerial images and which display the property component. For example, an aerial image displaying the piece of siding may display the color yellow overlaying the piece of siding.

While the level of risk indicators are described as the colors red, green and yellow, the indicators are not limited to those particular colors. Instead, the level of risks indicators may include any color and also may include any other suitable representation of a level of risk. For example, level of risk indicators may include numbers which are placed over each property component, may include labels which indicate the level of risk category for each property component, may include symbols which indicate the level of risk category for each property component, may include different shading techniques which indicate the level of risk category for each property component, etc.

The aerial images which display insured properties and include level of risk indicators may then be displayed on the client device for an insurance agent to view. In some embodiments, the client device may display a 3D aerial image of an insured property with level of risk indicators overlaying each property component. Moreover, in some embodiments, the client device may display several aerial images for a single insured property and include the level of risk indicators for each property component. As mentioned above, some aerial images may display more than one insured property and as a result, may be included in both sets of aerial images which display a first and a second insured property, respectively.

In some embodiments, the underwriting evaluation module may include a set of rules for determining an insurance premium based on the levels of risk of the various property components corresponding to an insured property. For example, the underwriting evaluation module may aggregate and/or combine the level of risk categories or the level of risk scores to determine an overall level of risk. The overall level of risk may be used to determine an appropriate insurance premium. In other embodiments, an insurance agent or a user of the client device may view the levels of risk of the various property components to determine the appropriate insurance premium for the insured property.

A display may include a legend which explains the meaning of each level of risk indicator present on the display. For example, the legend explains a red color indicates "high risk," a yellow color indicates "moderate risk," and a green color indicates "low risk." Moreover, the display may also include a key describing the property components which were identified for each level of risk category. For example, the key describes a swimming pool and poor roof are identified as high risk, a forest and dry timber are identified as moderate risk because they are considered fire hazards, and the area surrounding the pool is identified as low risk because of the liability associated with a wet deck or a pool.

Additionally, the display may include two insured properties, a first insured property and a second insured property. The display of the first insured property may include the property components: a roof, a swimming pool, a pool deck, a backyard, windows and siding. The first insured property may also include additional property components which may be shown more clearly in another display at a different angle, location and/or zoom level.

In any event, the roof is identified as being in poor condition, which may be determined from the condition assessment module. As a result, the roof in poor condition is identified as high risk which may be determined from the risk determination module, and assigned a red level of risk indicator. The red color is placed over the roof on the display to indicate high risk. Moreover, the swimming pool is also assigned the red level of risk indicator to indicate high risk. While the key does not explain that the swimming pool is in poor or even moderate condition, the swimming pool may be identified as high risk because of the inherent dangers associated with a pool, e.g., injuries in the pool, drowning, flooding, etc. The backyard is identified as moderate risk and assigned a yellow level of risk indicator, because of the fire hazards associated with the forestry in the backyard. Further, the pool deck is identified as low risk, because of the liability risks associated with a pool and the surrounding areas such as a wet deck.

The windows and siding are not identified as having any level of risk. This may be because of the excellent condition and/or maintenance. However, the windows and siding also may not be identified as having any level of risk because of the angle, location, and/or zoom level of the display. Other aerial images may capture a closer, more detailed version of the windows and siding, and the display from those aerial images may include a level of risk.

The second insured property also includes a red level of risk indicator assigned to the roof as well as a yellow level of risk indicator assigned to the backyard because of the forestry. As mentioned above, each aerial image may be grouped into a set of aerial images which display a single insured property. In this instance, the aerial image of the display may belong to the set of aerial images which display the first insured property and to the set of aerial images which display the second insured property. Moreover, each insured property may include several aerial images which may be taken from different angles, at different zoom levels, and at different locations in order to capture the complete insured property. The aerial image of the display may be just one of several images of the insured properties.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for determining a condition of a property using one or more aerial images, the method comprising:
receiving, at one or more processors, one or more aerial images of a property;
identifying, by the one or more processors, one or more portions of the one or more aerial images corresponding to one or more property components of the property;
for a particular property component:
determining, by the one or more processors, a degree of damage to the particular property component;
determining, by the one or more processors, a score indicating the degree of damage to the property component; and
determining, by the one or more processors, a condition of the particular property component based on the score;
determining, by the one or more processors, a level of risk of the property, wherein the level of risk is not based on the degree of damage of a property component;
assigning, by the one or more processors, a level of risk indicator to the property based upon the determined level of risk;
providing, by the one or more processors for display on a user interface, an indication of the condition of each property component overlaying the corresponding portion of the one or more aerial images; and
providing, by the one or more processors, the level of risk indicator for display on the user interface.

2. The computer-implemented method of claim 1, wherein determining the condition of the particular property component includes determining, by the one or more processors, a change in condition of the particular property component over time.

3. The computer-implemented method of claim 2, wherein determining the level of risk of the property includes determining, by the one or more processors, the level of risk of the property based upon an amount of time in which the property component is in a particular condition.

4. The computer-implemented method of claim 1, further comprising:
determining, by the one or more processors, an insurance premium for the property based upon the level of risk.

5. The computer-implemented method of claim 1, wherein the condition of the particular property component is categorized as at least one of: excellent, good, fair, or poor.

6. The computer-implemented method of claim 1, wherein the one or more property components include at least one of: a window, a door, a roof, siding, an exterior wall, a garage, a backyard, a swimming pool, a lawn, a driveway, a fence, a tree, a deck, or a patio.

7. A computer system for determining a condition of a property using one or more aerial images, the system comprising:
one or more processors;
a non-transitory computer-readable memory coupled to the one or more processors, and storing thereon instructions that, when executed by the one or more processors, cause the system to:
receive one or more aerial images of a property;
identify one or more portions of the one or more aerial images corresponding to one or more property components of the property;
for a particular property component:
determine a degree of damage to the particular property component;
determine a score indicating the degree of damage to the property component; and
determine a condition of the particular property component based on the score;
determine a level of risk of the property, wherein the level of risk is not based on the degree of damage of a property component;
assign a level of risk indicator to the property based upon the determined level of risk;
provide, for display on a user interface, an indication of the condition of each property component overlaying the corresponding portion of the one or more aerial images; and
provide the level of risk indicator for display on the user interface.

8. The computer system of claim 7, wherein the condition of the particular property component includes a change in condition of the particular property component over time.

9. The computer system of claim 8, wherein to determine the level of risk of the property, the instructions cause the system to determine the level of risk of the property based upon an amount of time in which the property component is in a particular condition.

10. The computer system of claim 7, wherein the instructions further cause the system to:
determine an insurance premium for the property based upon the level of risk.

11. The computer system of claim 7, wherein the condition of the particular property component is categorized as at least one of: excellent, good, fair, or poor.

12. The computer system of claim 7, wherein the one or more property components include at least one of: a window, a door, a roof, siding, an exterior wall, a garage, a backyard, a swimming pool, a lawn, a driveway, a fence, a tree, a deck, or a patio.

13. A non-transitory computer-readable memory coupled to one or more processors, and storing thereon instructions that, when executed by the one or more processors, cause the one or more processors to:
receive one or more aerial images of a property;
identify one or more portions of the one or more aerial images corresponding to one or more property components of the property;
for a particular property component:
determine a degree of damage to the particular property component;
determine a score indicating the degree of damage to the property component; and
determine a condition of the particular property component based on the score;
determine a level of risk of the property, wherein the level of risk is not based on the degree of damage of a property component;
assign a level of risk indicator to the property based upon the determined level of risk;

provide, for display on a user interface, an indication of the condition of each property component overlaying the corresponding portion of the one or more aerial images; and provide the level of risk indicator for display on the user interface.

14. The non-transitory computer-readable memory of claim 13, wherein the condition of the particular property component includes a change in condition of the particular property component over time.

15. The non-transitory computer-readable memory of claim 14, wherein to determine the level of risk of the property, the instructions cause the one or more processors to determine the level of risk of the property based upon an amount of time in which the property component is in a particular condition.

16. The non-transitory computer-readable memory of claim 13, wherein the instructions further cause the one or more processors to:

determine an insurance premium for the property based upon the level of risk.

17. The non-transitory computer-readable memory of claim 13, wherein the condition of the particular property component is categorized as at least one of: excellent, good, fair, or poor.

* * * * *